Figure 4:
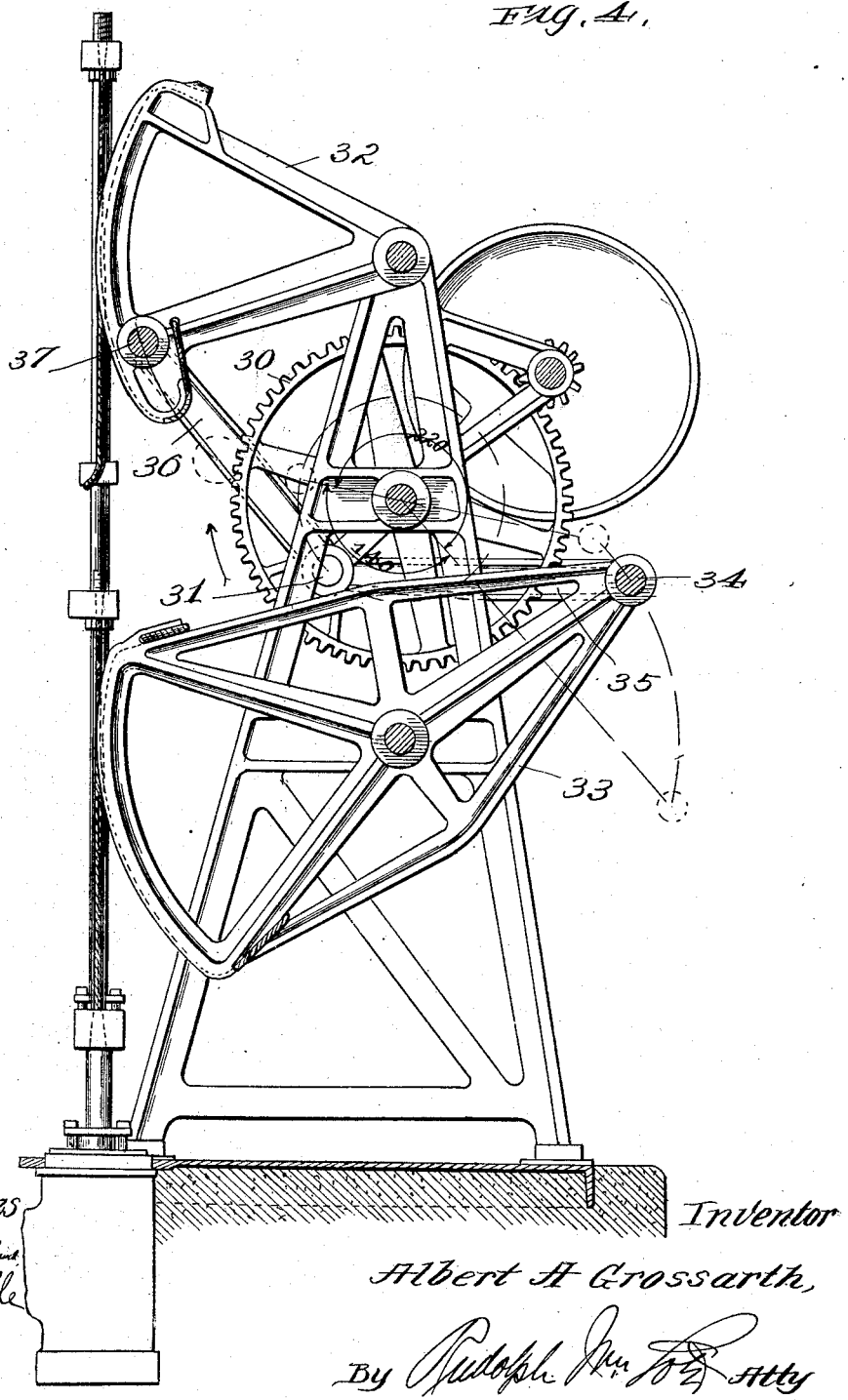

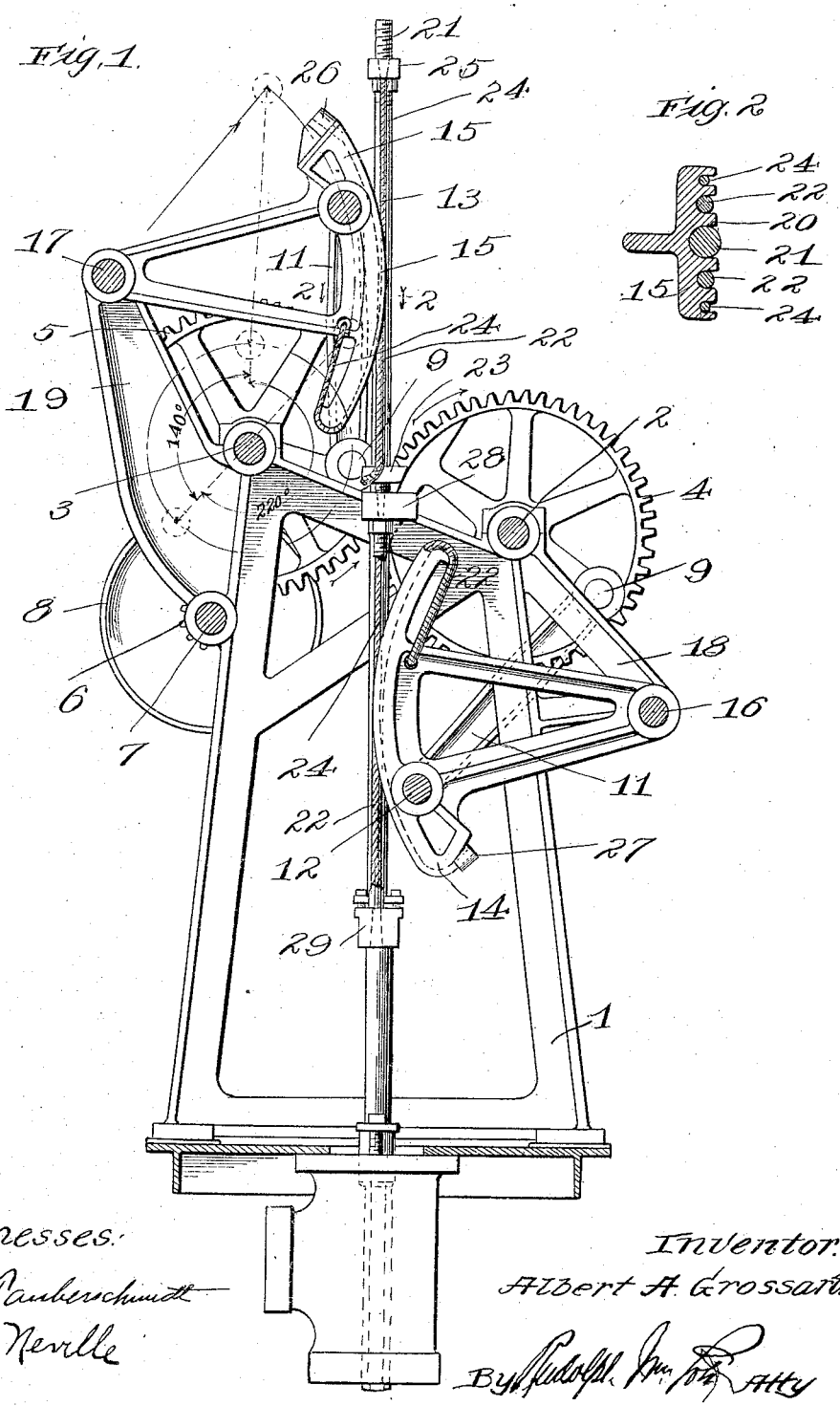

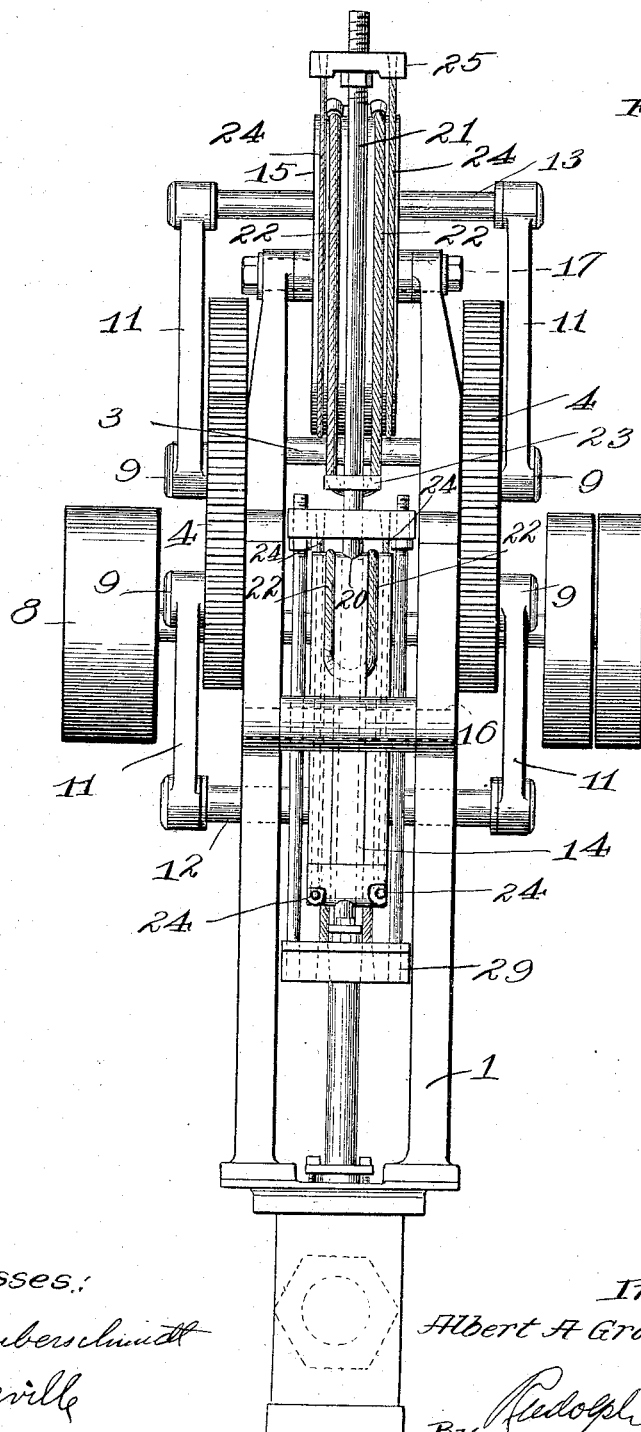

A. A. GROSSARTH.
DRIVE GEAR FOR DEEP WELL PUMPS.
APPLICATION FILED MAR. 17, 1915.

1,226,967.

Patented May 22, 1917.
4 SHEETS—SHEET 3.

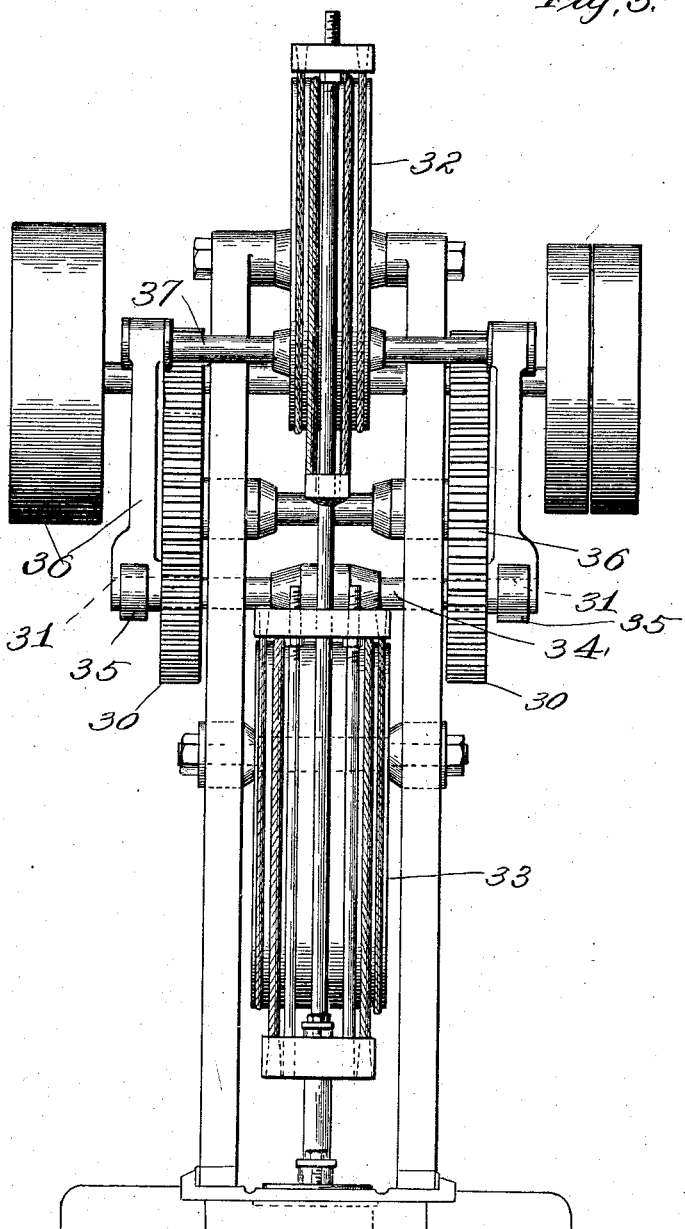

UNITED STATES PATENT OFFICE.

ALBERT A. GROSSARTH, OF CHICAGO, ILLINOIS.

DRIVE-GEAR FOR DEEP-WELL PUMPS.

1,226,967.

Specification of Letters Patent.

Patented May 22, 1917.

Application filed March 17, 1915. Serial No. 15,015.

*To all whom it may concern:*

Be it known that I, ALBERT A. GROSSARTH, citizen of the United States, residing at Chicago, in the county of Cook and State of Illinois, have invented certain new and useful Improvements in Drive-Gear for Deep-Well Pumps; and I do hereby declare the following to be a full, clear, and exact description of the invention, such as will enable others skilled in the art to which it appertains to make and use the same.

This invention has for its object to provide a drive gear particularly adapted for deep well pumps in which each cylinder of the pair is single acting, that is to say, constitutes a force pump on the up-stroke of the piston, the down-stroke of the latter being merely a suction stroke.

The particular object of the invention is to provide a drive gear in which the up or pressure stroke of the piston is accomplished more slowly than the down-stroke, and in such manner as to attain a gradual acceleration of the flow of water from the beginning to the point of greatest piston speed, and in which both pistons of the two pumps are moving simultaneously in the same direction during a portion of the up-stroke of each whereby the complete inertia of the water column moved by said pumps is avoided and greater efficiency attained.

A further object of the invention is to provide a drive gear of the character described which is so connected with the piston rods as to move the same positively in both directions with the minimum friction and in which the relation of the piston rod to the drive gear is such that the drive gear acts as a guide for the piston rod without, however, producing an appreciable resistant friction therebetween.

A further object of the invention is to provide a connection between the piston rod and drive gear which is very easily and quickly adjusted to place the same in the best condition for efficient operation.

Other objects of the invention will appear from the following specification.

In the accompanying drawings illustrating the invention:

Figure —1— is a vertical longitudinal section of a drive gear for deep well pumps embodying my invention.

Fig. —2— is a detail horizontal section on the line —2— of Fig. —1—.

Fig. —3— is a front elevation of the same.

Fig. —4— is a view similar to Fig. —1— showing a modified form of construction.

Fig. —5— is a front elevation of the structure shown in Fig. —4—.

The drive gear embodying my invention, as shown in Fig. —1—, comprises a suitable frame-work 1 upon which are bearings for the shafts 2 and 3 of intermeshing spur gears 4 and 5, of equal diameter, said spur gear 5 meshing with the spur pinion 6 on the drive shaft 7 carrying the pulley 8 or similar means for gearing the same to a source of power.

Each of said spur gears 4 and 5 is equipped with a crank pin 9 to which one end of the pitmen or connecting rods 11 is connected. Said pitmen connect at their other ends with wrist pins 12 and 13 respectively, of the sectors 14 and 15 each of the latter being mounted on shafts 16 and 17 respectively, journaled in bearings carried by the brackets 18 and 19 mounted upon the frame 1.

The spur gears 4 and 5 are arranged in pairs upon opposite sides of the frame 1, and the said sectors are disposed between the side pieces of the frame 1, the wrist pins 9 being relatively long and the shafts 16 relatively short, as will be seen in Fig. —3—.

The upper of the sectors is provided in its segmental face with a middle groove 20 in which one of the piston rods 21 is adapted to be received. Disposed on either side of said groove 20 are two similar but smaller grooves adapted to receive the cables 22, each of which is positively connected at one end with said sector and at its other end with the cross-head 23 on the piston rod to be actuated by the sector. Outwardly of the grooves containing the cables 22 is a pair of grooves adapted to receive cables 24, the latter being connected at one end with the sector and at their other ends with an adjustable cross-head 25 on the piston rod 21. The cables each consist of a single piece, the said cable 22 being looped through the cross-head 23 and the cable 24 being looped through the sector. The lower sector is provided with similar grooves for similar cables 22 and 24. The sector 15 is provided at one end with a pair of sockets 26 in which the ends of the cable 22 are received and securely fastened in any well-known manner and the companion sector is similarly provided with sockets 27 to receive the ends of the cable 24, the latter being looped through the adjustable cross-head 28 on its piston rod. The cable 22 of this sector is looped through the latter and is connected with the rigid cross-head 29.

The sectors are so disposed that the distance between their rock shafts 16 and 17 and the vertical axis of said piston rods is equal to the radial distance of the plane of the axis of all grooves in the face thereof so that during the rocking movement of each of said sectors the piston rod associated therewith remains engaged in the groove 20 thereof. The piston rod is thus held against movement relatively to the sector in three directions, being free only to move out of the groove 21. The axis of the cables 22 and 24 are disposed in the same vertical plane intersecting the axis of the piston rod 21 and the grooves in which said cables are engaged are varied in depth accordingly, as clearly shown in Fig. —2. Thus the pull on the cables transmitted to the piston to reciprocate the latter is always in the vertical plane of the axis of the piston rod whereby lateral or flexing pressures on the said piston rod are obviated. At the same time there is little or no friction between the sector and all of said cables and piston rod. By means of the adjustable cross-heads 25 and 28 slack in all of the cables connected with either sector may be readily taken up, each adjustable cross-head taking up slack in both cables 22 and 24 connected with its piston rod, so that the movement of the latter is at all times very smooth and positive, and this enables the piston rods to be reciprocated at a higher speed than would otherwise be possible.

In describing the operation of the drive-gear I will refer only to the gear 5 and parts associated therewith, as the gear 4 and its associated parts operate in unison therewith to alternately impart pressure strokes to the respective pistons.

By reference to Fig. —1— it will be noted that the crank-pin of the gear 5 describes a circle which contiguous to the piston is more or less vertically alined with the arc described by the wrist pin 13 of the sector 15. The gear 5 rotates in the direction of the arrow contiguous to and outwardly of its toothed face. The lowest and highest positions of the wrist pin 13 are indicated in dotted lines and its middle position in full lines. The corresponding three positions of the crank-pin of gear 5 are similarly illustrated and the arcs described by said crank-pin indicated as being one hundred forty degrees for the down-stroke of the sector and two hundred twenty degrees for the up-stroke. This is due to relative positions and dimensions of the correlated elements composing the drive-mechanism.

Primarily the position of the crank-pin at various points in its revolution relatively to the position of the wrist-pin at various points in its travel controls the relation of the down-stroke to the up-stroke with respect to relative speeds. This may be varied by varying the radial distance of the wrist-pin from the axis of the shaft 17, and also by varying the relative positions of the shafts 3 and 17 horizontally or vertically or both without varying the aforesaid radial distance of the wrist-pin 13 from the shaft 17. That is to say, variations as aforesaid will effect a change in the relative lengths of up and down-stroke arcs of travel of the crank-pin.

In the particular relative positions shown it will be seen that as the crank-pin begins its up-stroke movement the vertical planes intersecting its axis gradually approaches the vertical plane of the axis of the wrist-pin and these vertical planes become substantially coincident as the crank-pin completes about one-half of its up-stroke movement. Also that from this point said vertical planes remain substantially coincident until the up-stroke is completed, whereafter the vertical planes move in opposite directions becoming rapidly separated from each other. At the same time during the up-stroke movement of the crank-pin the horizontal planes intersecting the same and the wrist-pin attain and maintain their maximum separation, while during the down-stroke movement of the crank-pin they rapidly attain their minimum separation. The distance separating the said horizontal planes represents the effective length of the connecting rod 11, and this shortening of the distance separating the said horizontal planes is substantially equivalent to effecting a shortening of the length of the said connecting rod, or decreasing the radial distance between the axis of the shaft 17 and wrist-pin 13.

It will be obvious from the foregoing that the speed of travel of the face of the sector is constantly varying while the speed of the crank-pin remains uniform.

Following the movements of the sector with respect to the crank-pin it will be seen that from its lowest position the up-stroke of the sector through the first forty degree arc described by the crank-pin is slight and very gradual and that thereafter and until the completion of the first half of the up-stroke of said sector the movement thereof is constantly increasing in rapidity acquiring its maximum at this point. But during this movement of the sector through one-half of its up-stroke, the movement of the crank-pin extends through an arc considerably in excess of one hundred ten degrees or one-half its up-stroke movement. During this portion of the up-stroke the movement of the water columns raised by the piston is accelerated from its minimum to its maximum speed and the maximum power required for this is exerted during this movement of the crank-pin. From the completion of the first half until the end of the up-stroke the movement of the crank-pin and the wrist-pin is identical, there being no appreciable change in their relative elevations or lateral positions.

As the completion of the up-stroke is approached the speed of the upward movement of the water column decreases quite rapidly and cuts off quite suddenly as the upper limit of movement of the sector is attained. Thereupon the down-stroke begins and increases in speed in inverse ratio to the beginning of the up-stroke, the maximum speed being attained at the point in the movement of the crank-pin diametrically opposite the full-line position shown in Fig. —1— and then decreases in rapidity more and more gradually until the lower limit of movement of the sector is attained.

The down-stroke of the piston is merely a suction stroke and is aided by gravity so that very little power is consumed in its accomplishment, and it will be observed that during the down-stroke movement of the crank-pin very little power is exerted in proportion to that exerted upon the up-stroke.

It will also be obvious that before the sector 15 has attained the upper limit of its movement, the sector 14 will have begun its up-stroke and that the crank-pin of the gear 4 will have described an arc of forty degrees in its up-stroke movement at the time that the sector 15 has reached the upper limit of its movement. Hence the water column slows down but never stops and its acceleration and retardation are very gradual and smooth. Hence, it will be obvious that the drive gear described is very efficient and effects a saving of power as well as of wear and tear.

The invention may also be embodied as shown in Fig. —4— in which a single gear 30 is employed, having a crank-pin 31 connected with a sector 32 corresponding to one of the sectors 14 or 15 and with a sector 33 which may be termed a "walking beam sector", having its wrist pin 34 and grooved face disposed at diametrically opposite sides of its axis of oscillation. Two connecting rods 35 and 36 connect the crank-pin 31 with the wrist-pin 34 and the wrist-pin 37 of the sector 32.

The relative positions of the several elements above described differs from that shown in Fig. —1— but, as will be seen from the diagrammatically illustrative arcs and circles, the result is identical and attained in substantially the same way as by means of the construction illustrated in Fig. —1—.

By reference to either Fig. —1— or Fig. —4— of the drawings it will readily be seen that the total distance traveled by any one of the wrist pins between perpendiculars to piston axis is considerably greater than the diameter of the circle described by its associated crank-pin, although the distance between the two is fixed by the connecting rod.

It will be found that as the vertical plane of the axis of rotation of the crank-pin and the mean vertical plane of the axis of its companion wrist pin approach each other, the less will be the difference in the distances between perpendiculars to said planes traveled by said crank-pin and wrist pin. And as this difference decreases the ratio of speed of the down-stroke to the up-stroke will decrease and the relative speeds of travel of the wrist pin and crank pin will become more uniform.

If it be imagined that the connecting rod connects directly with the piston rod and the sector be eliminated, the foregoing may be more readily understood, and it will then be seen also that the use of the sector increases the variation besides obviating the lateral pressure to which the piston rod would be subjected if the connection between the same and the crank pin were direct. That is to say, in using the sector the vertical planes intersecting the crank-pin and the wrist-pin move simultaneously toward and from each other alternately and during a portion of their movement travel laterally in unison, whereas if the connection were made directly with the piston the vertical plane of the crank-pin only would move laterally and there would be no such movement in unison in the same direction as in the case of the sector.

While I have employed the term "vertical" herein it will be understood that the drive gear may be differently disposed and thus change the position of said planes. This term applies aptly to the embodiment shown but shall not be construed as a limitation.

It will also be apparent that although the particular means connecting the sectors with the piston rods are most advantageous and direct, it would be possible to interpose gearing between the sector and the part to be actuated thereby and thus change the relation of the planes to the axis of the reciprocated or driven part, but such changes are included in the invention as defined in the appended claims.

I claim as my invention:

1. A drive gear for pumps comprising a rocking member having a wrist pin and operatively connected with and adapted to impart reciprocal movement to the piston rod, a rotatable crank, a connecting rod connecting said crank and wrist pin, the axis of rotation of said crank and the axis of oscillation of said rocking member relatively disposed to cause the vertical plane of the crank-pin and the vertical plane of the wrist pin to move simultaneously away from each other during the down-stroke of said rocking member, and to move simultaneously toward each other during a part of the up-stroke thereof and to move simultaneously in the same direction during a portion of said up-stroke, whereby a constant variation in relative speed of movement of the crank-pin and rocking member throughout the greater portion of each revolution of the crank-pin is attained.

2. A drive gear for pumps comprising a rocking member having a wrist pin and operatively connected with and adapted to impart reciprocal movement to the piston rod, a rotatable crank, a connecting rod connecting said crank and wrist pin, the axis of rotation of said crank and the axis of oscillation of said rocking member relatively disposed to cause the vertical plane of the crank-pin and the vertical plane of the wrist pin to move simultaneously away from each other during the down-stroke of said rocking member, and to move simultaneously toward each other during a part of the up-stroke thereof and to move simultaneously in the same direction during a portion of said up-stroke, whereby a constant variation in relative speed of movement of the crank-pin and rocking member throughout the greater portion of each revolution of the crank-pin is attained and whereby the relative speeds of movement of the crank-pin and wrist are practically identical through an appreciable arc of movement of said crank-pin.

3. A drive gear for pumps comprising a rocking member having a wrist pin and operatively connected with and adapted to impart reciprocal movement to the piston rod, a rotatable crank, a connecting rod connecting said crank and wrist pin, the axis of rotation of said crank and the axis of oscillation of said rocking member relatively disposed to cause the vertical plane of the crank-pin and the vertical plane of the wrist pin to move simultaneously away from each other during the down-stroke of said rocking member, and to move simultaneously toward each other during a part of the up-stroke thereof and to move simultaneously in the same direction during a portion of said up-stroke, whereby a constant variation in relative speed of movement of the crank-pin and rocking member throughout the greater portion of each revolution of the crank-pin is attained and whereby the relative speeds of movement of the crank-pin and wrist are practically identical through an arc of substantially ninety degrees in the movement of said crank-pin.

4. A drive gear for pumps including an oscillating sector, a rotatable crank-pin, a connection interposed therebetween, and connection between the sector and a piston rod to be reciprocated thereby, whereby the latter is reciprocated in a plane through which the face of said sector oscillates, the axis of rotation of said crank pin lying in a vertical plane between the similar parallel planes of the axis of oscillation of the sector and pivotal connection between the latter and said connecting rod whereby during one part of the rotation of the crank-pin, the latter and the pivotal connection of the sector with the connecting rod will move simultaneously laterally away from the piston rod and will thereafter move simultaneously in respectively opposite directions relatively to said piston rod, to vary the relative speeds of travel of said piston rod in opposite directions through two successive equal arcs of movement of said crank-pin.

5. A drive gear for pumps including an oscillating sector, a rotatable crank-pin, a connection interposed therebetween, and connection between the sector and a piston rod to be reciprocated thereby, whereby the latter is reciprocated in a plane through which the face of said sector oscillates, the axis of rotation of said crank pin disposed relatively to the axis of oscillation of said sector and the pivotal axis of the connection between the latter and said connecting rod to cause the last-named axis to describe an arc of appreciably different length than the diameter of the circle described by said crank-pin.

6. A drive gear for pumps including an oscillating sector, a rotatable crank-pin, a connection interposed therebetween, and connection between the sector and a piston rod to be reciprocated thereby, whereby the latter is reciprocated in a plane through which the face of said sector oscillates, the axis of rotation of said crank pin disposed relatively to the axis of oscillation of said sector and the pivotal axis of the connection between the latter and said connecting rod to cause the last-named axis to move a distance between parallel planes transverse to the piston axis appreciably greater than the diameter of the circle described by said crank-pin.

7. A drive gear for pumps including an oscillating sector, a rotatable crank-pin, a connecting rod interposed therebetween, connection between the sector and piston rod for reciprocating the latter, the axis of rotation of the crank-pin and the axis of oscillation of said sector disposed relatively to the point of connection of the connecting rod with said sector to cause the crank-pin to travel through a longer arc during the first half of the pressure stroke of the piston rod than during the remainder of said stroke.

8. A drive gear for pumps including an oscillating sector connected with the piston rod, a rotatable crank-pin, a connecting rod interposed between the same and said sector for oscillating the latter, the paths of travel of said crank-pin and the pivotal connection of the rod with the sector relatively disposed to become separated in a direction laterally of the axis of the piston rod to a greater degree during the stroke of the piston in one direction than during the stroke thereof in the opposite direction, whereby the arc of movement of the crank-pin covering the first-named piston stroke is shorter than the arc covering the last-named stroke.

In testimony whereof I have signed my name in presence of two subscribing witnesses.

ALBERT A. GROSSARTH.

Witnesses:
R. W. LOTZ,
G. M. NEVILLE.

Copies of this patent may be obtained for five cents each, by addressing the "Commissioner of Patents, Washington, D. C."